United States Patent
Huberman

(10) Patent No.: US 11,936,780 B1
(45) Date of Patent: Mar. 19, 2024

(54) QUANTUM KEY DISTRIBUTION FOR SECURE AND PRIVATE TRANSACTIONS

(71) Applicant: CABLE TELEVISION LABORATORIES, INC., Louisville, CO (US)

(72) Inventor: Bernardo Huberman, Palo Alto, CA (US)

(73) Assignee: CABLE TELEVISION LABORATORIES, INC., Louisville, CO (US)

(*) Notice: Subject to any disclaimer, the term of this patent is extended or adjusted under 35 U.S.C. 154(b) by 167 days.

(21) Appl. No.: 17/346,130

(22) Filed: Jun. 11, 2021

Related U.S. Application Data

(60) Provisional application No. 63/038,689, filed on Jun. 12, 2020.

(51) Int. Cl.
*H04L 9/08* (2006.01)
*G06N 10/00* (2022.01)
*H04L 9/32* (2006.01)

(52) U.S. Cl.
CPC ........... *H04L 9/0858* (2013.01); *G06N 10/00* (2019.01); *H04L 9/0894* (2013.01); *H04L 9/3215* (2013.01)

(58) Field of Classification Search
CPC ... H04L 9/0858; H04L 9/0894; H04L 9/3215; G06N 10/00
See application file for complete search history.

(56) References Cited

PUBLICATIONS

Ibrahim, "Two-Party Private Vector Dominance: The All-Or-Nothing Deal," Third International Conference on Information Technology: New Generations (ITNG'06), Las Vegas, NV, USA, 2006, pp. 166-171, doi: 10.1109/ITNG.2006.136. (Year: 2006).*
Damle, "A Practical Solution to Yao's Millionaires' Problem and Its Application in Designing Secure Combinatorial Auction", 2019, arxiv.org. (Year: 2019).*

\* cited by examiner

*Primary Examiner* — Brian F Shaw
(74) *Attorney, Agent, or Firm* — COZEN O'CONNOR

(57) ABSTRACT

A transaction discovery protocol determines when a value r is less than a value a without learning the value of r or a. The protocol (1) receives, at a first computer via a secure communication channel, value $a^x$, where x is a secret key unknown to the first computer; (2) generates vector B where a first entry is the value r, and subsequent entries are equal to the previous entry plus a predefined resolution; (3) generates vector $B^y$ from the vector B using secret key y, unknown to a second computer, and sends vector $B^y$ to the second computer; (4) receives vector $B^{yx}$ from the second computer and generates value $a^{xy}$; and (5) completes an agreement between the first computer and the second computer when the value $a^{xy}$ is equal to one of the entries in the vector $B^{yx}$, indicating that the value r is less than the value a.

20 Claims, 3 Drawing Sheets

QUANTUM KEY DISTRIBUTION FOR SECURE AND PRIVATE TRANSACTIONS

RELATED APPLICATIONS

This application claims priority to U.S. Patent Application Ser. No. 63/038,689, titled "Quantum Key Distribution for Secure and Private Transactions," filed Jun. 12, 2020, and incorporated herein by reference.

BACKGROUND

Quantum computing presents a unique challenge to current Internet security. The public key infrastructure used to generate and distribute Internet transport encryption keys is particularly vulnerable to quantum algorithms that provide an exponential speed-up in discovering private keys and thereby unlocking the symmetric encryption keys that protect data communications from eavesdroppers.

In many situations, two (or more) entities (e.g., a buyer and a seller) engage in fruitless rounds of negotiations (e.g., when the buyer is bidding in an auction) trying to discover if a highest bid of the buyer is higher than a reservation price of the seller. Notice that the discovery of the bid and the reservation price by the seller and the buyer, respectively, can be used strategically in order to engage in the same commerce, as for example in spectrum auctions by network providers.

SUMMARY

One aspect of the present embodiments includes the realization that a human involved in a chain of actions and events is the most vulnerable part of the chain. Thus, there is a need for an efficient and easily implementable mechanism that, together with secure communication offered by Quantum Key Distribution (QKD), determines whether a first value is higher than a second value without revealing the first or second values, and without requiring a third-party to be involved. The present embodiments solve this problem by removing the third party from the chain that determines whether the first value is greater than, or equal to, the second value without revealing the first and second values to other parties.

Another aspect of the present embodiments includes the realization that secure third-party evaluation of the first and second values requires a significant amount of communication. The present embodiments solve that problem by reducing the amount of communication between the first party computer and the second party computer.

Another aspect of the present embodiments includes the realization that communication with a third-party increases the vulnerability of the communication being intercepted. The present embodiments solve this problem by eliminating communication outside of the interested parties, and thereby requiring only communication between the involved parties.

Another aspect of the present embodiments includes the realization that a provably secure communication channel requires each party using the channel to be at a secure location to obtain the provably secure key, and therefore, the greater the number of parties involved, the greater the complexity involved in establishing the provably secure communications between the parties. The present embodiments solve this problem by requiring only communication between the involved parties, and therefore only one provably secure communication channel is required. Advantageously, the complexity of configuring provably secure communication is minimized.

Another aspect of the present embodiments includes the realization that where encrypted values are decrypted for evaluation, the decrypted values are vulnerable. The present embodiments solve this problem by comparing the encrypted values without decrypting them. Advantageously, the values remain encrypted when communication to other computers and are never decrypted, and therefore cannot be stored in a decrypted format outside the sending computer.

In certain embodiments, a method securely and privately determines whether a value r is less than a value a. The method includes using quantum key distribution to form a provably secure communication channel between a first computer and a second computer; generating, at the second computer, a value $a^x$ using the value a and a secret key x of the first computer; sending the value $a^x$ to the first computer via the provably secure communication channel; generating, at the first computer, a value $a^{xy}$ using the value $a^x$ and a secret key y of the first computer; sending, from the first computer, the value $a^{xy}$ to the second computer via the provably secure communication channel; generating, at the first computer, a vector B having N entries, N being an integer greater than one, wherein a first of the N entries is the value r, and subsequent ones of the N entries are an immediately previous entry plus an increment that is a predefined resolution; generating, at the first computer, a vector $B^y$ using the vector B and the secret key y; sending, from the first computer, the vector $B^y$ to the second computer via the provably secure communication channel; generating, at the second computer, a vector $B^{yx}$ using the vector $B^y$ and the secret key x; sending, from the second computer, the vector $B^{yx}$ to the first computer via the provably secure communication channel; completing an agreement between the first computer and the second computer when the value $a^{xy}$ is equal to one of the N entries in the vector $B^{yx}$; and wherein both the first computer and the second computer perform calculations modulo p, where p is a large prime number.

In certain embodiments, a method securely and privately determines whether a first value r is less than a second value a without sharing the first value r and without learning the second value a. The method includes receiving, at a first party computer via a secure communication channel with a second party computer, a third value $a^x$, where x is a secret key unknown to the first party computer; generating a first vector B having N entries, N being an integer, a first of the N entries being the first value r, and subsequent ones of the N entries being a previous entry plus an increment that is a predefined resolution; generating a second vector $B^y$ using the first vector B and a secret key y unknown to the second party computer; sending the second vector $B^y$ to the second party computer via the secure communication channel; receiving a third vector $B^{yx}$ from the second party computer via the secure communication channel; generating a fourth value $a^{xy}$ using the third value $a^x$ and the secret key y; and completing an agreement between the first party computer and the second party computer when the fourth value $a^{xy}$ is equal to one of the N entries in the third vector $B^{yx}$.

In certain embodiments, a non-transitory computer-readable media stores instructions that, when executed by a processor, perform steps for securely and privately determining whether a first value r is less than a second value a without sharing the first value r and without learning the second value a. The computer-readable media includes instructions for receiving, at a first party computer via a secure communication channel with a second party computer, a third value $a^x$, where x is a secret key unknown to the first party computer; instructions for generating a first vector B having N entries, N being an integer, a first of the N entries being the first value r, and subsequent ones of the N entries being a previous entry plus an increment that is a predefined resolution; instructions for generating a second vector $B^y$ using the first vector B and a secret key y unknown to the second party computer; instructions for sending the second vector $B^y$ to the second party computer via the secure communication channel; instructions for receiving a third vector $B^{yx}$ from the second party computer via the secure communication channel; instructions for generating a fourth value $a^{xy}$ using the third value $a^x$ and the secret key y; and instructions for completing an agreement between the first party computer and the second party computer when the fourth value $a^{xy}$ is equal to one of the N entries in the third vector $B^{yx}$.

In certain embodiments, a method securely and privately determines whether a first value r is less than a second value a without learning the first value r and without sharing the second value a. The method includes calculating a value $a^x$ by raising the second value a to the power x, where x is a secret key unknown to a first party computer; sending the value $a^x$ to the first party computer via a secure communication channel; receiving a value $a^{xy}$ from the first party computer via the secure communication channel; receiving a first vector $B^y$ of N entries from the first party computer via the secure communication channel; generating a second vector $B^{yx}$ where each of N entries in the second vector $B^{yx}$ is calculated by raising a corresponding one or the N entries of the first vector $B^y$ to the power of x; sending the second vector $B^{yx}$ to the first party computer via the secure communication channel; and completing an agreement with the first party computer when the value $a^{xy}$ is equal to one of the N entries in the second vector $B^{yx}$.

DETAILED DESCRIPTION OF THE EMBODIMENTS

Quantum key distribution (QKD) uses the exchange of quantum bits (qubits) between two parties to generate a symmetric key. Depending on the QKD protocol used, it can be proven that the shared key was not observed by an eavesdropper, and thus that it is provably secure. Transport Layer Security (TLS) and the deprecated Secure Sockets Layer (SSL) protocols used by the vast majority of web services and provides transport security for web services. Advantageously, TLS supports pre-shared and may therefore be used with QKD keys. U.S. patent application Ser. No. 17/222,478, titled "Quantum Secured Internet Transport," filed Apr. 5, 2021, provides additional detail on TLS use of QDK, and is incorporated herein by reference in its entirety.

Figure 1:
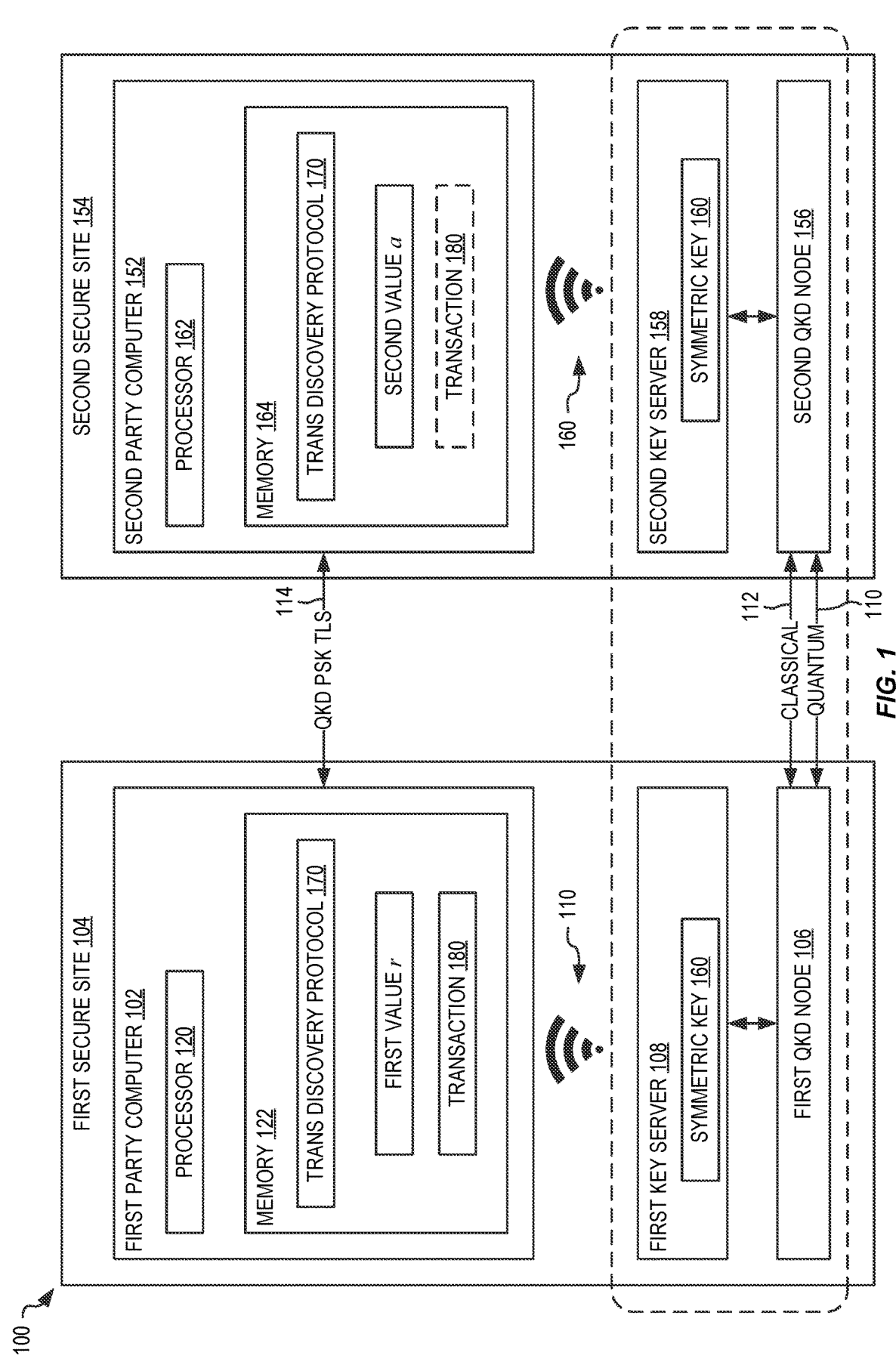
FIG. 1 shows one example system implementing QKD for secure and private transactions, in embodiments.

FIG. 1 shows one example system 100 implementing QKD for secure and private transactions. System 100 includes a first party computer 102 located at a first secure site 104 and a second party computer 152 located at a second secure site 154. First secure site 104 and second secure site 154 may each represent one of a bank building, a business campus, a government office, and so on. First secure site 104 includes a first QKD node 106 and second secure site 154 includes a second QKD node 156. First QKD node 106 and second QKD node 156 are communicatively connected by a quantum channel 110 formed using one or more of optical fiber cables and/or free-space optics. As shown, first QKD node 106 and second QKD node 156 may also communicate over a classical communication channel 112, such as one or both of wired and/or wireless infrastructure. First QKD node 106 and second QKD node 156 may determine share keys (e.g., symmetric keys) in an absolutely secure way. As shown, first secure site 104 may also include a first key server 108 that securely stores a symmetric key 160 determined by first QKD node 106 and second QKD node 156 using quantum channel 110, and second secure site 154 includes a second key server 158 that also stores symmetric key 160. Particularly, first QKD node 106 and/or second QKD node 156 may detect when eaves dropping occurs on quantum channel 110, and thus, when no eavesdropping is detected, QKD nodes 106/156 provide provably secure symmetric key 160, which may be stored in a first key server 108 and second key server 158, respectively.

At each secure site 104/154, symmetric key 160 may be distributed wirelessly to first party computer 102 and second party computer 152, respectively. This wireless distribution is a trade-off between security and mobility, since it is not feasible to connect all devices with optical fibers or free-space optics. Each of first party computer 102 and second party computer 152 may use symmetric key 160 to encrypt wireless communication therebetween. Since symmetric key 160 is securely determined and/or distributed (e.g., using quantum channel 110), first party computer 102 and second party computer 152 may roam away from secure sites 104/154 and continue their secure communication provided that they still possess symmetric key 160 (and/or any other securely delivered keys). First party computer 102 and second party computer 152 advantageously use symmetric key 160 to form a QKD PSK TLS channel 114 that provides secure communication between first party computer 102 and second party computer 152.

Secret Transaction

In the example of FIG. 1, a transaction 180 is a contract between a seller and a buyer at an auction, where first party computer 102 represents the seller and second party computer 152 represents the buyer. The seller has a reserve price, first value r, and the buyer makes a bid, second value a. System 100 determines whether the buyer's bid, second value a, is equal to, or higher than, the seller's reserve price, first value r, but without disclosing second value a (e.g., the bid) to first party computer 102 (e.g., the seller) and without disclosing first value r (e.g., the reserve price) to second party computer 152 (e.g., the buyer). Conventionally, a semi-honest third-party receives both the bid and the reserve price and performs the evaluation as to whether the bid is equal to, or greater then, the reserve price, without revealing the bid values or the reserve price to other parties. Through use of a transaction discovery protocol 170, system 100 secretly and securely determines transaction 180 without third-party involvement.

Transaction discovery protocol 170 is, for example, software implemented as machine-readable instructions stored in (a) memory 122 of first party computer 102 and executed by processor 120 and (b) memory 164 of second party computer 152 and executed by processor 162. For example, transaction discovery protocol 170 may be part of an application that is downloaded onto each of first party computer 102 and second party computer 152, where first party computer 102 and second party computer 152 are each a smartphone and/or a tablet computer. Transaction discovery protocol 170 implements a secure and efficient zero-knowledge protocol that does not require third-party involvement in order to secretly determine whether second value a (e.g., the bid from the buyer) is equal to or greater than first value r (e.g., the reservation price of the seller). Transaction discovery protocol 170 implements a protected way of performing transactions that avoids the complexity of the so-called "millionaire's problem," where two people want to discover who is wealthier without revealing their net worth. By using transaction discovery protocol 170, second party computer 152 does not discover first value r, but when transaction discovery protocol 170 determines that second value a is equal to, or greater then, first value r, first party computer 102 generates transaction 180 and receives second value a from second party computer 152 since second party computer 152 (the buyer) won the auction. When second value a is less than first value r, transaction discovery protocol 170 determines that the auction is not won by second value a, no transaction is generated, and first value r and second value a are not revealed to the other parties.

Figure 2:
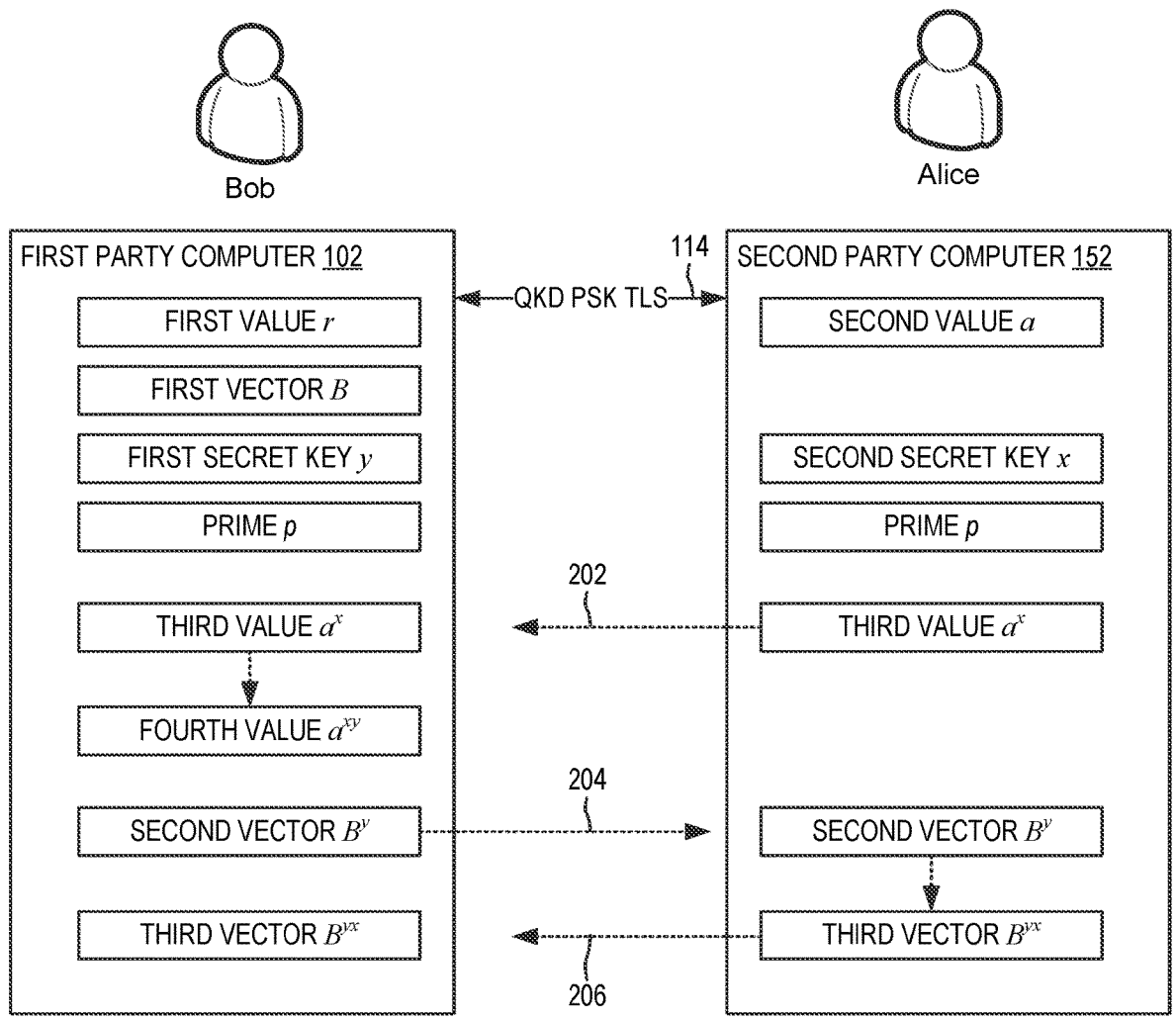
FIG. 2 is a schematic diagram illustrating example data exchanges between a seller (Bob) and a buyer (Alice) during evaluation of first value r and second value a by the transaction discovery protocol of FIG. 1.

FIG. 2 is a schematic diagram illustrating example data exchanges between a seller (Bob) and a buyer (Alice) during evaluation of first value r and second value a by transaction discovery protocol 170 of FIG. 1. Advantageously, through use of transaction discovery protocol 170, the amount of communication between first party computer 102 and second party computer 152 is significantly lower than would be needed for a third-party evaluation. Another advantage of using transaction discovery protocol 170, is that no communication outside of the interested parties is required, since transaction discovery protocol 170 requires only communication between first party computer 102 and second party computer 152. A further advantage of using transaction discovery protocol 170 is that configuration of the provably secure communication channel (e.g., QKD PSK TLS channel 114) is simplified, since only one provably secure communication channel is required. Another significant advantage of transaction discovery protocol 170 is that, at least until a result is determined, the encoded values of first value r and second value a are never decoded or stored on any computer other than the originator of the value. Thus, the values are always secure, even if stored. QKD PSK TLS channel 114 (e.g., a provably secure communication channel over TLS using QKD) is established between first party computer 102 and second party computer 152. However, transaction discovery protocol 170 may operate over less secure TLS channels (e.g., conventional TLS) without departing from the scope hereof.

Figure 3:
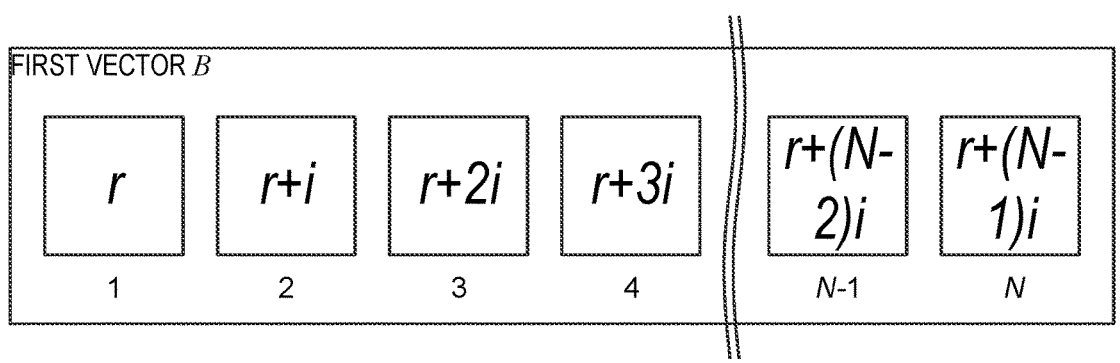
FIG. 3 is a block diagram showing first vector B in further example detail, in embodiments.

Once QKD PSK TLS channel 114 is established, transaction discovery protocol 170 of first party computer 102 generates a first vector B based on first value r. FIG. 3 is a block diagram showing first vector B in further example detail. First vector B has N entries, N being an integer greater than one, and a first of the N entries is set to first value r. Subsequent entries in first vector B are equal to the previous entry plus an increment corresponding to an agreed price resolution (e.g., $10, $100, etc.). For example, where first value r is $500 and the agreed price resolution of $10, first vector B may have entries of $500, $510, $520, and so on. N is selected, by the seller, to provide a sufficient range of entries within first vector B to cover the range of expected bids. In certain embodiments, transaction discovery protocol 170 of second party computer 152 may generate a vector corresponding to second value a, where a first entry of the vector is set to second value a, and subsequent entries are zero. In these embodiments, the vector may also contain multiple bids (e.g., ordered from lowest to highest), whereby transaction discovery protocol 170 finds the lowest entry in the vector that matches an entry in the first vector B, using the protocol described below. However, in these examples, Alice makes a single bid, and therefore a vector is not needed, but may be used where implementation is simplified.

Transaction discovery protocol 170 of first party computer 102 generates a first secret key y, and transaction discovery protocol 170 of second party computer 152 generates a second secret key x. First secret key y is not known by second party computer 152, and second secret key x is not known by first party computer 102. Transaction discovery protocol 170 also selects a common large prime number, prime p, which is stored at each of first party computer 102 and second party computer 152. Prime p is sufficiently large that a computer would take a large amount of time to factor it. In certain embodiments, first party computer 102 and second party computer 152 may negotiate to agree upon prime p. All computations by transaction discovery protocol 170 are thereafter performed modulo prime p.

Transaction discovery protocol 170 of second party computer 152 generates a third value $a^x$, by raising second value a to the power second secret key x, modulo prime p, and sends third value $a^x$ to first party computer 102 via QKD PSK TLS channel 114, as illustrated by arrow 202. Transaction discovery protocol 170 of first party computer 102 generates a fourth value $a^{xy}$ by raising third value $a^x$ to the power first secret key y, modulo prime p. In certain embodiments, fourth value $a^{xy}$ is sent to second party computer 152 to allow transaction discovery protocol 170 within second party computer 152 to determine whether the bid was won; however, this transfer is not needed when the determination is made only by first party computer 102.

Transaction discovery protocol 170 of first party computer 102 generates a second vector $B^y$ by raising each entry of first vector B to the power first secret key y, modulo prime p, and sending second vector $B^y$ to second party computer 152 via QKD PSK TLS channel 114, as illustrated by arrow 204. Transaction discovery protocol 170 of second party computer 152 generates a third vector $B^{yx}$ by raising each entry of second vector $B^y$ to the power second secret key x, modulo prime p, and sending third vector $B^{yx}$ to first party computer 102 via QKD PSK TLS channel 114, as illustrated by arrow 206.

First party computer 102 then compares fourth value $a^{xy}$ to entries of third vector $B^{yx}$, starting at the first entry and testing successive entries until fourth value $a^y$ equals the entry or no more entries exist. When a match (equality) is found, transaction discovery protocol 170 determines that second value a is equal to, if the first entry is matched, or greater than, if a subsequent entry is matched, the first value r and generates transaction 180. Since $A^{xy}$ is numerically equivalent to $A^{yx}$ and since all calculations are performed modulo prime p, equality of any entry of third vector $B^{yx}$ to fourth value $a^{xy}$ indicates that second value a is greater than, or equal to, first value r. Particularly, transaction discovery protocol 170 only determines a value of second value a when a match is found between fourth value $a^{xy}$ and one entry of third vector $B^{yx}$. When no match is found, transaction discovery protocol 170 of first party computer 102 cannot determine the value of first value a. Further, transaction discovery protocol 170 of second party computer 152 cannot determine first value r since first secret key y is not known. Security Security of transaction 180 is based on transaction discover protocol 170 which implements secure multiparty computation, and is based on the intractability of the discrete logarithm problem: given integers a and b and prime p, it is computationally hard to find integer x such that:

$$b^x = a \pmod{p}$$

Security if further increased because data exchanges are performed over a symmetrically encrypted channel that is secure from eavesdropping, particularly when the symmetric key is determined using QKD and is provably secure.

Figure 4:
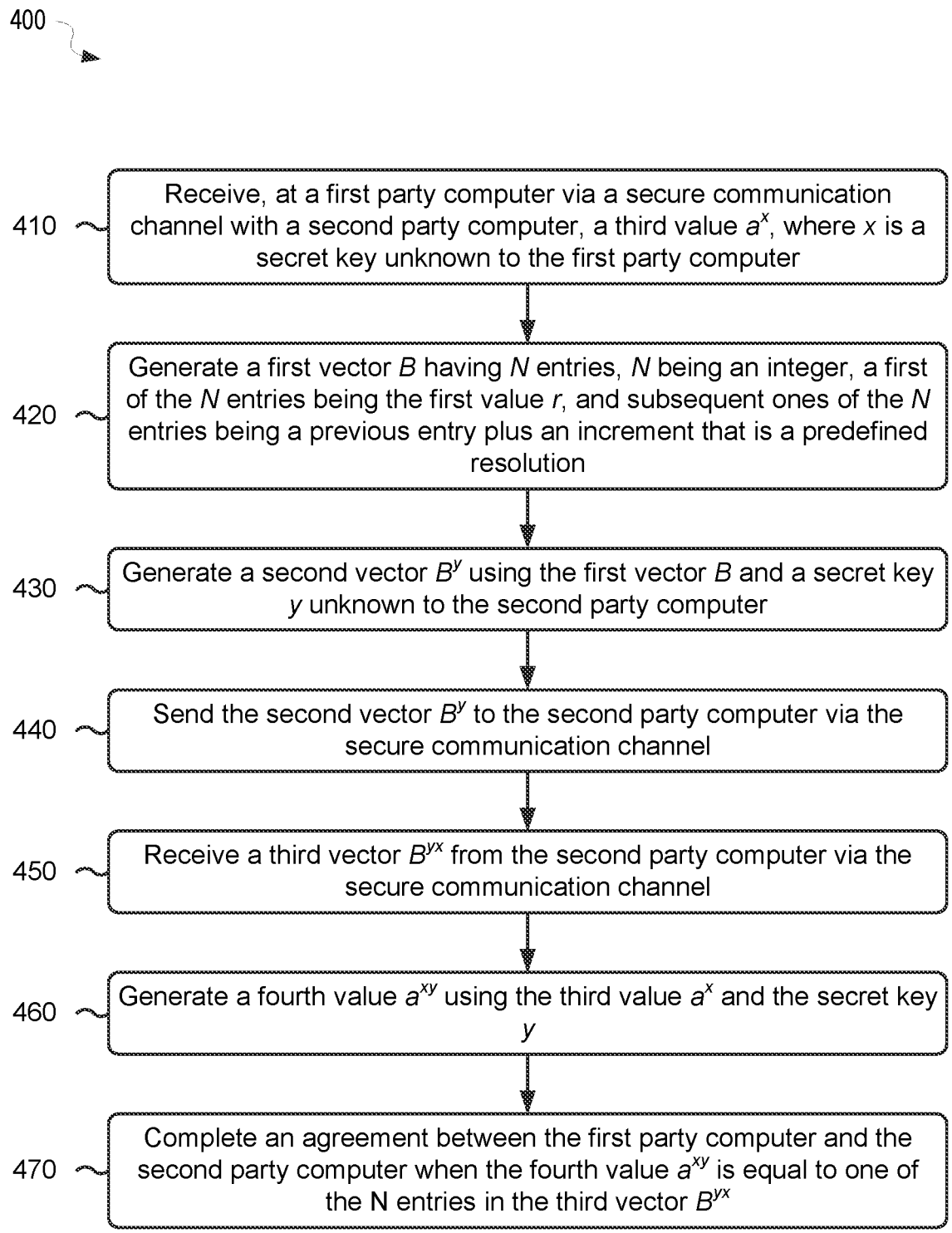
FIG. 4 is a flowchart showing one example method for quantum key distribution for secure and private transactions, in embodiments.

FIG. 4 is a flowchart showing one example method 400 for quantum key distribution for secure and private transactions. In some implementations, one or more blocks of FIG. 4 are implemented by a transaction discovery protocol (e.g., transaction discovery protocol 170, FIG. 1). Additionally, or alternatively, one or more blocks of FIG. 4 may be performed by one or more components of first party computer 102 and/or second party computer 152, such as processors 120 and 162, and memory 122 and memory 164.

In block 410, method 400 may include receiving, at a first party computer via a secure communication channel with a second party computer, a third value $a^x$, where x is a secret key unknown to the first party computer. In one example of block 410, transaction discovery protocol 170 of first party computer 102 receives, via QKD PSK TLS channel 114 from second party computer 152, third value $a^x$, where x is a secret key unknown to the first party computer.

In block 420, method 400 may include generating a first vector B having N entries, N being an integer, a first of the N entries being the first value r, and subsequent ones of the N entries being a previous entry plus an increment that is a predefined resolution. In one example of block 420, transaction discovery protocol 170 generates first vector B having N entries, N being an integer, the first entry being first value r, and subsequent entries being the previous entry plus an increment that is a predefined resolution.

In block 430, method 400 may include generating a second vector $B^y$ using the first vector B and a secret key y unknown to the second party computer. In one example of block 430, transaction discovery protocol 170 generates second vector $B^y$ raising each entry of first vector B to the power of first secret key y, which is unknown to second party computer 152.

In block 440, method 400 may include sending the second vector $B^y$ to the second party computer via the secure communication channel. In one example of block 440, transaction discovery protocol 170 sends second vector $B^y$ to second party computer 152 via QKD PSK TLS channel 114.

In block 450, method 400 may include receiving a third vector $B^{yx}$ from the second party computer via the secure communication channel. In one example of block 450, transaction discovery protocol 170 in first party computer 102 receives third vector $B^{yx}$ from second party computer 152 via QKD PSK TLS channel 114.

In block 460, method 400 may include generating a fourth value $a^{xy}$ using the third value $a^x$ and the secret key y. In one example of block 460, transaction discovery protocol 170 in first party computer 102 generates fourth value $a^{xy}$ by raising third value $a^x$ to the power first secret key y.

In block 470, method 400 may include completing an agreement between the first party computer and the second party computer when the fourth value $a^{xy}$ is equal to one of the N entries in the third vector $B^{yx}$. In one example of block 470, transaction discovery protocol 170 generates transaction 180 to form an agreement between first party computer 102 and second party computer 152 when fourth value $a^{xy}$ is equal to one of N entries in third vector $B^{yx}$.

Although FIG. 4 shows example blocks of method 400, in some implementations, method 400 may include additional blocks, fewer blocks, different blocks, or differently arranged blocks than those depicted in FIG. 4. Additionally, or alternatively, two or more of the blocks of method 400 may be performed in parallel without departing from the scope hereof.

Private Auctions

Although the examples of FIGS. 1-4 illustrate first party computer 102 transacting with one second party computer 152 (e.g., buyer Alice), system 100 may facilitate private auctions with multiple second party computers, each bidding in the same auction. For example, first party computer 102 determines first value r, as described above. Each of the multiple second party computers 152 receives a private key, issued by first party computer 102 via a point to multipoint distribution of keys in passive optical networks (PON). Advantageously, the private keys are distributed using QKD, which allows secure private key distribution. See U.S. patent application Ser. No. 17/073,207, titled "Quantum Key Distribution and Management in Passive Optical Networks," filed Oct. 16, 2020, and incorporated herein by reference.

Each of the multiple second party computers 152 (e.g., Bidders) submit a bid (e.g., second value a) using transaction discovery protocol 170 as described above and first party computer 102 selects the highest match above the reserve price (e.g., first value r) and announces the winner of the auction. In certain embodiments, where first party computer 102 sends fourth value $a^{xy}$ to the respective second party computer 152, transaction discovery protocol 170 on that second party computer 152 may privately determine that their corresponding second value a (e.g., their bid value) was above first value r (e.g., the reserve price), but cannot determine the value of the winning bid. However, that value may be published by first party computer 102 is desired.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method performed by a first computer in communication with a second computer, comprising:

transmitting, to the second computer, an initial vector $\vec{B} = (B_1, B_2, \ldots, B_N)$ having N elements, the $j^{th}$ element $B_j$ of the initial vector $\vec{B}$ equaling $(i \cdot j \cdot r)^y \mod p$, wherein:

r is a first value that is known to the first computer and unknown to the second computer;

y is a first secret key that is known to the first computer and unknown to the second computer;

p is a large prime number that is known to both the first and second computers;

i is an increment that is a positive integer;

N is a positive integer; and j is an index running from 1 to N;

receiving, from the second computer, a transformed vector $\vec{B}^*=(B_1^*, B_2^*, \ldots, B_N^*)$ having N elements, the $j^{th}$ element $B_j^*$ of the transformed vector $\vec{B}^*$ equaling $(B_j)^x \mod p$, wherein:
  x is a second secret key that is known to the second computer and unknown to the first computer; and
receiving, from the second computer, a third value $a^* = a^x \mod p$, wherein:
  a is a second value that is known to the second computer and unknown to the first computer;
determining if the first value r is less than the second value a by determining if a fourth value $a^{**} = (a^*)^y \mod p$ equals one of the N elements of the transformed vector $\vec{B}^*$; and
completing an agreement between the first and second computers in response to the first value r being less than the second value a.

2. The method of claim 1, wherein:
the first value r is a reserve price of a seller;
the second value a is a bid from a buyer; and
the agreement is a sales contract.

3. The method of claim 1, further comprising cooperating with the second computer to determine the increment i.

4. The method of claim 1, further comprising generating the first secret key y.

5. The method of claim 1, further comprising cooperating with the second computer to select the large prime number p.

6. The method of claim 1, further comprising transmitting the fourth value $a^{**}$ to the second computer.

7. The method of claim 1, further comprising using quantum key distribution to perform one or more of:
  said sending the initial vector $\vec{B}$;
  said receiving the transformed vector $\vec{B}^*$; and
  said receiving the third value $a^*$.

8. The method of claim 1, wherein said receiving the third value $a^*$ includes receiving a vector $\vec{A}$, wherein one of a plurality of elements of the vector $\vec{A}$ being the third value $a^*$.

9. The method of claim 1, wherein each of the plurality of elements of the vector $\vec{A}$ corresponds to a bid.

10. The method of claim 1, further comprising transmitting, to the second computer and in response to the second value a not exceeding the first value r, an indication that the second value a does not exceed the first value r.

11. The method of claim 1, further comprising calculating the second value a in response to the fourth value $a^{**}$ equaling one of the N elements of the transformed vector $\vec{B}^*$.

12. A method performed by a second computer in communication with a first computer, comprising:

receiving, from the First computer, an initial vector $\vec{B}=(B_1, B_2, \ldots, B_N)$ having N elements, the $j^{th}$ element $B_j$ of the initial vector $\vec{B}$ equaling $(i \cdot j \cdot r)^y \mod p$, wherein:
  r is a first value that is known to the first computer and unknown to the second computer;
  y is a first secret key that is known to the first computer and unknown to the second computer;
  p is a large prime number that is known to both the first and second computers;
  i is an increment that is a positive integer;
  N is a positive integer; and
  j is an index having values between 1 to N, inclusive;
transmitting, to the first computer, a transformed vector $\vec{B}^*=(B_1^*, B_2^*, \ldots, B_N^*)$ having N elements, the $j^{th}$ element $B_j$ of the transformed vector $\vec{B}^*$ equaling $(B_j)^x \mod p$, wherein:
  x is a second secret key that is known to the second computer and unknown to the first computer;
transmitting, to the first computer, a third value $a^* = a^x \mod p$, wherein:
  a is a second value that is known to the second computer and unknown to the first computer; and
completing an agreement with the first computer in response to the first computer indicating that the first value r is less than the second value a.

13. The method of claim 12, further comprising cooperating with the first computer to select the large prime number p.

14. The method of claim 12, further comprising using quantum key distribution to perform one or more of:
  said receiving the initial vector $\vec{B}$;
  said transmitting the transformed vector $\vec{B}^*$; and
  said transmitting the third value $a^*$.

15. The method of claim 12, further comprising receiving a fourth value $a^{**}=(a^*)^y \mod p$ from the first computer.

16. The method of claim 12, wherein:
the first value r is a reserve price of a seller;
the second value a is a bid from a buyer; and
the agreement is a sales contract.

17. The method of claim 12, further comprising cooperating with the first computer to determine the increment i.

18. The method of claim 12, further comprising generating the second secret key y.

19. The method of claim 18, wherein each of the plurality of elements of the vector $\vec{A}$ correspond to a bid.

20. The method of claim 12, wherein said transmitting the third value $a^*$ includes transmitting a vector $\vec{A}$, wherein one of a plurality of elements of the vector $\vec{A}$ being the third value $a^*$.

* * * * *